United States Patent
Chamousset et al.

(10) Patent No.: US 7,837,016 B2
(45) Date of Patent: Nov. 23, 2010

(54) VEHICLE SUSPENSION STOP DEVICE WITH REINFORCED SEALING

(75) Inventors: Anthony Chamousset, Sales (FR); Laurent Lebrun-Damiens, Seynod (FR)

(73) Assignee: S.N.R. Roulements, Annecy (FR)

( * ) Notice: Subject to any disclaimer, the term of this patent is extended or adjusted under 35 U.S.C. 154(b) by 716 days.

(21) Appl. No.: 11/798,782

(22) Filed: May 16, 2007

(65) Prior Publication Data
US 2007/0267793 A1 Nov. 22, 2007

(30) Foreign Application Priority Data
May 16, 2006 (FR) .................. 06 04361
Sep. 22, 2006 (FR) .................. 06 08340

(51) Int. Cl.
*F16F 9/00* (2006.01)
(52) U.S. Cl. .................. 188/321.11; 267/221
(58) Field of Classification Search .......... 267/217, 267/219, 220, 221; 188/321.11; 280/124.155; 384/609, 614, 618, 623
See application file for complete search history.

(56) References Cited

U.S. PATENT DOCUMENTS

| 5,467,971 A | 11/1995 | Hurtubise et al. |
| 6,126,155 A | 10/2000 | Smith et al. |
| 6,257,605 B1 | 7/2001 | Zernickel et al. |
| 7,032,912 B2 * | 4/2006 | Nicot et al. ............ 280/124.155 |
| 7,077,248 B2 * | 7/2006 | Handke et al. ......... 188/321.11 |

FOREIGN PATENT DOCUMENTS

| DE | 198 09 074 A1 | 1/1999 |
| DE | 19752268 A1 * | 5/1999 |
| DE | 199 23 847 A1 | 12/1999 |
| DE | 100 47 773 A1 | 4/2002 |
| FR | 2 839 471 A1 | 11/2003 |
| FR | 2 857 906 A | 1/2005 |
| FR | 2 859 412 A1 | 3/2005 |
| FR | 2 867 421 A1 | 9/2005 |

* cited by examiner

*Primary Examiner*—Thomas J Williams
(74) *Attorney, Agent, or Firm*—Arent Fox, LLP

(57) ABSTRACT

A suspension stop for a suspension strut of a vehicle equipped with a coil spring (10) comprises a rigid thrust bearing (24) equipped with a lower metal washer (28) rotating with respect to an upper metal washer (26), a synthetic material support part (38) designed to transmit the forces exerted by the spring to the lower washer and a cover (22) covering the upper washer and delimiting together with the support part a housing (54) for the bearing. The cover is equipped with a skirt (22) delimiting with the peripheral area of the support part an annular labyrinth (60), arranged radially outside the housing and connecting the housing to the outside, with the annular labyrinth successively comprising, from the housing towards the outside, an initial annular head loss of radial play P1, a second annular head loss of axial play P2, followed by a third annular head loss of radial play P3.

9 Claims, 4 Drawing Sheets

VEHICLE SUSPENSION STOP DEVICE WITH REINFORCED SEALING

CROSS-REFERENCE TO RELATED APPLICATION

This application claims the priority of FR Application No. 0604361, filed May 16, 2006 and FR Application No. 0608340, filed Sep. 22, 2006, the entire specifications, claims and drawings of which are incorporated herewith by reference.

TECHNICAL FIELD OF THE INVENTION

The invention relates to a suspension stop for a vehicle suspension strut, particularly for a telescopic suspension strut for an automobile guiding wheel, equipped with a bearing and means of protection of this bearing.

FORMER STATUS OF TECHNOLOGY

Conventionally, suspension thrust bearings are housed in two-part casings, closed by sealing lips attached to one of the parts of the casing and rubbing against the other part of the casing, as illustrated in document EP 1 000 781. This technology has the disadvantage of inducing friction torque between the rotating parts, known as the drag torque, which is particularly harmful in applications on guiding wheels.

In order to eliminate this drag torque, it has been proposed to replace the conventional sealing linings with contact-free baffle devices, i.e. devices the rotating elements of which are interlocked with each other, without contact, in order to create a major head loss between the exterior and the housing of the bearing. A first example of this type of technology is offered by document FR 2 857 906, which describes a suspension stop for a suspension strut with a coil spring, comprising a thrust bearing defining a rotation axis of the device and equipped with a lower metal washer rotating with respect to an upper metal washer. A synthetic material support part is arranged between the coil spring and the bearing, in order to transmit the forces exerted by the spring to the lower washer. A cover is provided over the upper washer which delimits together with the support part a housing for the bearing. The cover is equipped with a cylindrical skirt covering without contact a cylindrical peripheral area of the support part and delimiting a head loss between the housing and the exterior. The simple structure of the head loss makes it possible to adapt to relative movements between the cover and the support part, movements which are due in particular to the low level of rigidity of the bearing washers. Nevertheless, rising of liquid by capillarity is not ruled out and the seal is not of good quality.

A second example of protection of a contact-free suspension thrust bearing is provided by document U.S. Pat. No. 6,257,605, which describes a suspension stop for a suspension strut with a coil spring, comprising a thrust bearing defining a rotation axis of the device and equipped with a lower metal washer rotating with respect to an upper metal washer. A synthetic material support part is arranged between the coil spring and the bearing, in order to transmit the forces exerted by the spring to the lower washer. A cover is provided over the upper washer which delimits together with the support part a housing for the bearing. The cover and the support part delimit an initial labyrinth seal. A second labyrinth seal, outside the first, is delimited between a continuation of the support part and a metal sheet for securing the bearing the vehicle bodywork. A large-size annular chamber equipped with a drain is arranged between the two labyrinth seals. The device and its constituent components are extremely complex. The second labyrinth seal necessarily has a high degree of play owing to its distance from the suspension strut axis, since the movements of the strut outside its axis due to the elastic deformation of the components and the operational play are enhanced as a result. The performances of this external seal in terms of sealing are therefore poor, hence the need for the intermediate chamber drain. Furthermore, the drain runs directly into a protection chamber of the rod of the telescopic shock absorber of the suspension strut, which results in contamination of the shock absorber. The system is therefore inefficient and very costly.

ACCOUNT OF THE INVENTION

The invention therefore aims to provide a solution to the disadvantages of the status of technology in order to offer a stop which makes it possible, without friction and without significantly increasing the axial and radial bulk, to guarantee a good quality seal between the rotating elements of a suspension stop.

To this end, the aim of the invention is a suspension stop device for a vehicle suspension strut, the strut being equipped with a coil spring and the device comprising:

a rigid thrust bearing defining a rotation axis of the device and equipped with a lower metal washer rotating with respect to an upper metal washer;

a synthetic material support part designed to transmit the forces exerted by the spring to the lower washer, with the intermediate support part comprising an annular support area for the lower washer; and a cover covering the upper washer and delimiting together with the support part a housing for the bearing, the cover being provided with a skirt covering without contact a peripheral area of the support part and delimiting with the peripheral area of the support part an annular labyrinth, arranged radially with respect to the exterior of the housing and connecting the housing to the exterior, with the annular labyrinth successively comprising, from the inside to the outside of the housing, an initial annular head loss of radial play P1, a second annular head loss of axial play P2 and a third annular head loss of radial play P3.

The rigidity of the bearing makes it possible to achieve relatively low levels of play, without any risk of friction at the level of the labyrinth.

Preferentially, the skirt forms an upper cylindrical wall which delimits the initial head loss with the peripheral area of the support part. The peripheral area of the support part comprises an annular flange equipped with a radial end edge located opposite the upper cylindrical wall and delimiting the initial head loss with the upper cylindrical wall. The annular flange forms a shoulder interacting with elastic hooks projecting from the skirt of the cover. These elastic hooks are not in contact with the shoulder under the conditions of use, once the device is mounted on the vehicle, but serve to hold the cover, the bearing and the support part together in order to form a pre-assembled functional subassembly.

Preferentially, the annular labyrinth comprises, after the third head loss towards the exterior, a fourth annular head loss of axial play P4. The seal is therefore reinforced. Preferentially, the skirt comprises a flat or truncated cone-shaped annular wall which delimits the fourth head loss with the peripheral area of the support part, with the flat or truncated cone-shaped annular wall having a radial dimension E.

According to an embodiment, the flat annular wall of the skirt is comprised of an end edge of the skirt, with the skirt being of a thickness at least equal to T at the level of this edge. Advantageously, the skirt is of a constant thickness equal to T over its entire length.

Preferentially, T is greater than 1 mm. In practice, T may be on the order of 1.5 mm.

Preferentially, the peripheral area of the support part comprises a flat annular wall which delimits with the skirt the second head loss. Advantageously, the annular wall of the skirt is situated at a distance B from the flat or truncated cone-shaped annular wall, preferably constituting the end edge of the skirt, dimensions B≦T being linked by the relationship: B≦3 T. According to a preferred embodiment, in that: P1≦1 mm and B≦2 T. These dimensions indicate that dimension B does not need to be excessively large in order to obtain a good seal, which makes it possible to obtain a compact structure.

Advantageously, the peripheral area of the support part comprises a cylindrical wall forming with the skirt the third head loss and located at a radial distance A from the upper cylindrical wall of the skirt, with dimensions A and T being linked by the relationship: A≦2.5 T. Preferentially, P2≦1 mm and A≦1.5 T.

According to a embodiment, the skirt comprises a cylindrical internal wall, ensuring the third head loss with the peripheral area of the support part.

According to a embodiment, the skirt comprises a flat annular wall delimiting the second head loss with the peripheral area of the support part.

Preferentially, the labyrinth is located axially under an external annular opening of the bearing delimited by the upper and lower washers, i.e. on the coil spring side. The course of the liquid or solid pollutants originating from outside is therefore hindered by gravity.

Preferentially, the cover delimits an upper cavity between the external annular opening of the bearing and the initial head loss. According to a embodiment, the peripheral area of the support part delimits with the skirt an intermediate annular cavity having a radial section area $S_1$, located between the initial head loss and the second head loss in such a manner that $S_1 \geq 4 \times P1 \times P2$. According to a embodiment, the peripheral area of the support part delimits with the skirt a lower annular cavity having a radial section area $S_2$, located between the third head loss and the fourth head loss in such a manner that $S_2 \geq 4 \times P4 \times P3$. The upper, intermediate and lower annular cavities restrict rising of liquid by capillarity. The upper cavity also allows storage of grease.

According to a embodiment, the first and third plays are equal. According to a embodiment, play P3 is less than 2 mm. According to a embodiment, P1 and P2 are less than 2 mm.

Preferentially, the bearing washers are manufactured from pressed metal sheet and are of a thickness exceeding 1.2 mm.

Preferentially, running bodies are arranged between the upper and lower washers.

According to a embodiment, the running bodies consist of balls with a load line angled with respect to the rotation axis.

Advantageously, the external diameter $\Phi_1$ of the skirt and the primary diameter $\Phi_2$ of the bearing are such that:

$$\frac{\Phi_1}{\Phi_2} \leq 1,2$$

In this manner, the relative movements of the components in flexion have little effect and consequently the risks of friction on the labyrinth walls are limited.

The support part is provided with a spring support shoulder. Preferentially, the external diameter $1_3$ of the spring support shoulder and the external diameter $0_1$ of the skirt are such that:

$$0,9 \leq \frac{\Phi_1}{\Phi_3} \leq 1,1$$

This makes it possible to restrict deformation of the components in flexion and consequently limits the risks of friction between the labyrinth walls under the operating conditions.

The rigidity of the bearing is such that when the device, oriented such that its rotation axis is vertical, is held in a vice at a diametrical end of its periphery located in a reference first axial geometric plane and when a vertical force F corresponding to a torque of F×D=70 Nm is applied to the opposite diametric end situated in the first axial plane, D being the distance between the point of application of the force F and a second axial geometric plane perpendicular to the first axial plane, with the intermediate support part resting on a wedge arranged in the second axial plane, the deflexion angle of the part of the device located on the side of the diametric end of application of the force F, measured in the first axial plane is less than 8°.

BRIEF DESCRIPTION OF THE FIGURES

Other advantages and characteristics will be more clearly apparent from the following description of the particular methods of realisation of the invention, which are given as non-limitative examples and are represented in the appended drawings in which.

In order to simplify the presentation, the elements common to the different embodiments will be denoted by the same reference signs and their description will not be systematically repeated.

DETAILED DESCRIPTION OF A EMBODIMENT

Figure 1:
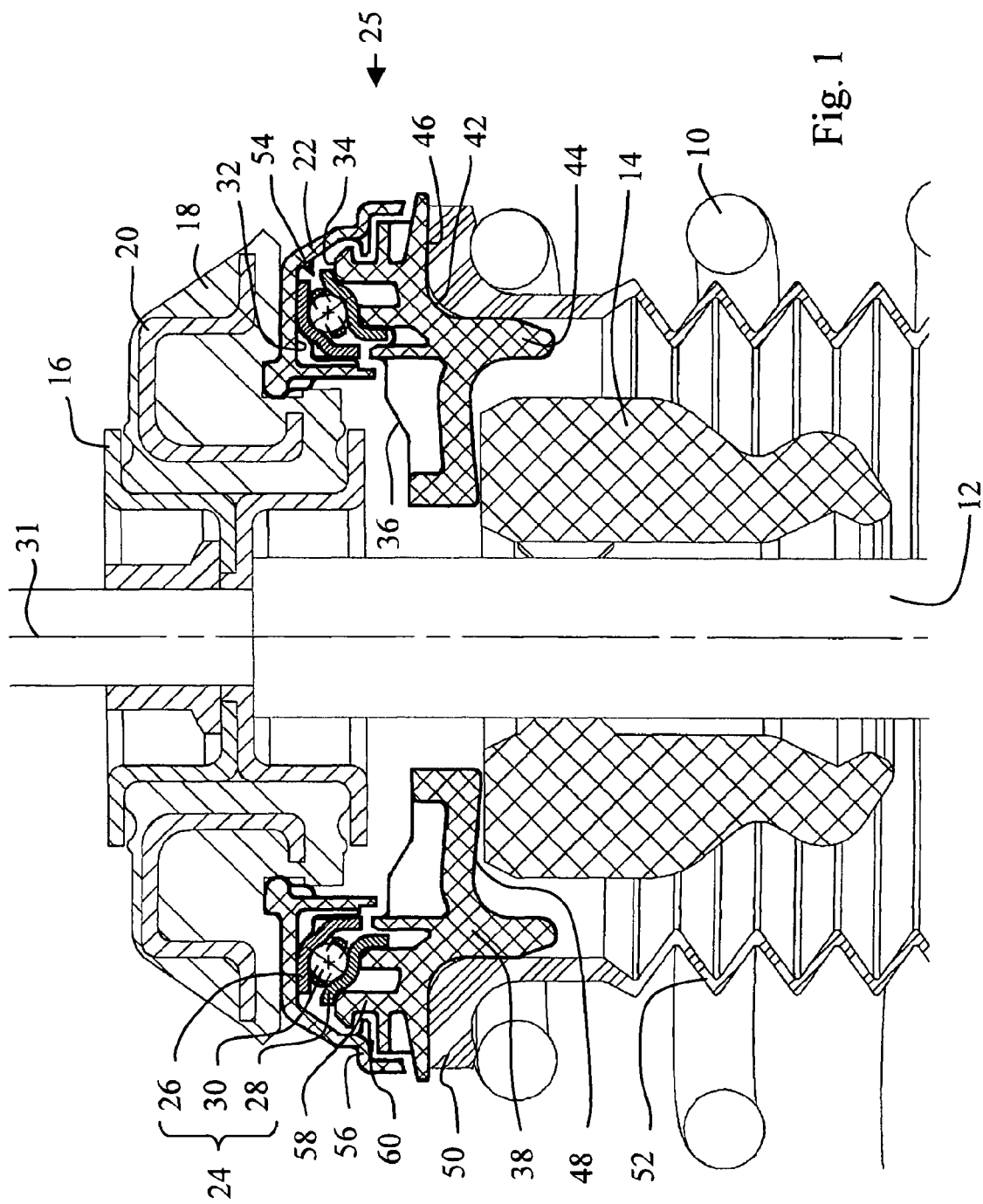
FIG. 1 represents, in axial cross section, a stop of a suspension strut according to a first embodiment of the invention.

With reference to FIG. 1, a telescopic suspension strut comprises a coil spring 10, a telescopic shock absorber of which only the rod 12 is visible and a shock absorbing buffer 14, these elements being arranged between a wheel and the bodywork of a vehicle. The rod 12 of the shock absorber is fixed at its upper end by means of a connecting flange 16 to an elastomer block 18 reinforced by a metal insert 20 and attached continuously in itself to the structure of a vehicle. The elastomer block 18 also constitutes an upper support seat for a cover 22 which houses a ball bearing 24 of a suspension stop 25.

The bearing 24 is comprised of an upper washer 26 and a lower washer 28, both made of pressed steel and forming oblique contact bearing races for running bodies such as balls 30 or conical rollers. The bearing therefore defines a rotation axis 31 of the stop. The upper washer 26 rests on the base 32 of the cover 22, whereas the lower washer 28 rests on a support area 34 forming a positioning relief on the upper surface 36 of a support part 38 made of synthetic material. The support part 38 comprises, on the side of its lower surface 42, a cylindrical skirt 44 which separates an external transverse shoulder 46 for supporting the spring 10 and an internal transverse shoulder 48 for supporting the shock absorbing buffer 14. Between the external shoulder 46 and the spring 10, the annular end 50 of a pleated sleeve 52 may be interposed, designed to protect the shock absorber against external contamination, with this end 50 of the sleeve forming, if appropriate, a mechanical filter between the spring and the intermediate part, making it possible in particular to limit transmission of the rotation noises of the wheel to the vehicle bodywork.

The cover 22 delimits together with the support part a housing 54 for the bearing 24. The cover 22 is equipped with a skirt 56 covering without contact a peripheral area 58 of the support part 38 and delimiting with the peripheral area 58 of the support part an annular labyrinth 60 connecting the housing 54 to the outside.

Figure 2:
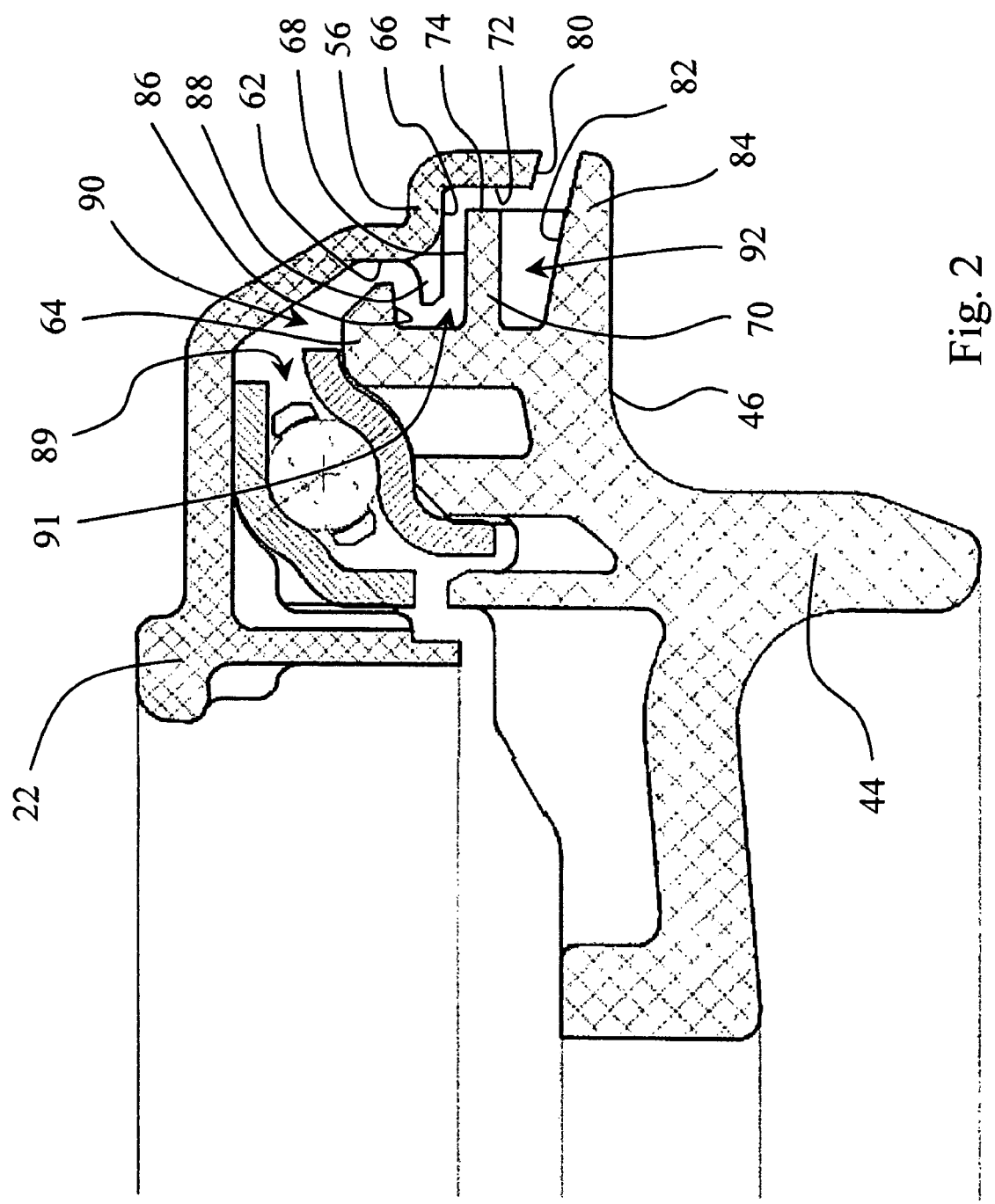
FIG. 2 represents a detailed view of the stop of the first embodiment of the invention.

As represented in detail in FIG. 2, this annular labyrinth 60 successively comprises, progressing from the housing to the outside, an initial loss of radial play P1 formed between a cylindrical internal wall 62 of the skirt and a collar 64 of the peripheral area 58 of the support part, followed by a second loss of axial play P2, formed between a flat annular wall 66 of the skirt and a flat annular wall 68 of a radial projection 70 of the support part, followed by a third head loss of axial play P3, formed between a second cylindrical internal wall 72 of the skirt and a cylindrical edge 74 of the projection 70, followed finally by a fourth head loss of axial play P4, formed between the lower truncated cone-shaped end edge 80 of the skirt and a truncated cone-shaped wall 82 of a collar 84 of the peripheral area of the support part, the lower section of which constitutes the shoulder 46 for supporting the spring 10.

The collar 64 also forms a shoulder 86 which allows insertion of elastic hooks 88 projecting radially towards the exterior from the internal skirt 56. These hooks 88 serve to render the cover 22 interdependent with the support part 44 in order to form a single subassembly which is installed as is on the elastomer block 18.

The labyrinth 60 is located axially under an external annular opening 89 of the bearing delimited by the upper washer 26 and lower washer 28. The cover 22 delimits an upper cavity 90 between the external annular opening 89 of the bearing and the initial head loss. An intermediate annular cavity 91 is formed between the radial projection 70, the collar 64 of the support part and the skirt 56. This cavity, partially occupied by the hooks 88, is located between the first and second head losses and a section S, which is relatively large, preferably greater than 4×P2×P1. Likewise, a lower annular cavity 92 is formed between the radial project, the truncated cone-shaped wall and the skirt. This cavity 92, open on one side to the third head loss and on the other side to the fourth head loss, is also of large size, its section $S_2$ being preferably greater than 4×P3×P4. The three cavities 90, 91, 92 make it possible to halt rising of liquid by capillarity. Furthermore, the descending slope of the truncated cone-shaped wall 82 promotes evacuation of any possible outside contamination.

The radial plays P1 and P3 must have a minimum dimension which is essentially a function of the radial installation tolerances and the radial deformations of the device under the conditions of use. In practice, P1 and P3 may be equal and relatively small, on the order of 1 mm to 2.5 mm for example and preferably larger than 1.5 mm.

As for the axial plays P2 and P4, they must have a minimum dimension which is a function of the axial installation tolerances in addition to the axial and flexion deformations of the device under the conditions of use. In order to reduce the influence of the flexion deformations and limit these plays to a sufficient level and reduce the play without the risk of resulting in contact between the components, the external diameter $\Phi_1$ of the skirt must not be much greater than the primary diameter $\Phi_2$ of the bearing. Preferentially, $$1 \leq \frac{\Phi_1}{\Phi_2} \leq 1,2$$

In this example of realisation, one has:

$$\frac{\Phi_1}{\Phi_2} \approx 1,1$$

Likewise, the external diameter $0_3$ of the support shoulder of the spring must be of the same magnitude as the external diameter $0_1$ of the skirt. Preferentially, $$0,9 \leq \frac{\Phi_1}{\Phi_3} \leq 1,1$$

In this exemplary embodiment, one has:

$$\frac{\Phi_1}{\Phi_3} \approx 1,0$$

It should be noted that the washers 26, 28 forming the bearing 22 are of high rigidity, which makes it possible to maintain very low levels of play at the level of the head losses. These washers 26, 28 are preferentially made of pressed metal sheet 1.2 to 2 mm thick. In the exemplary embodiment, 1.5 mm metal sheet has been used.

Figure 3:
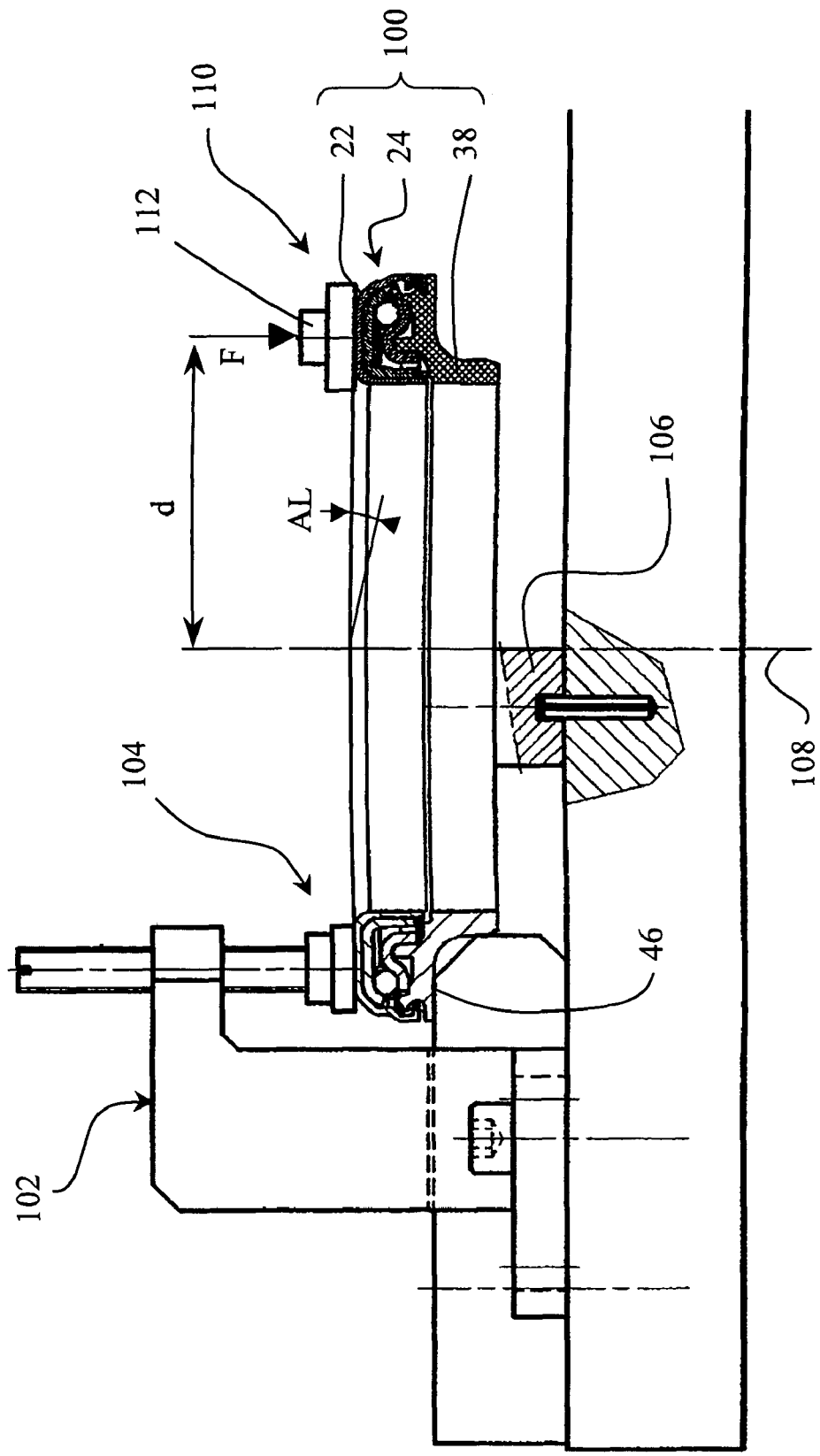
FIG. 3 represents a measurement bench for the rigidity in flexion of a stop according to the invention.

In order to characterise the rigidity of the subassembly 100 formed by the cover 22, the bearing 24 and the support part 38, a qualification test was performed, represented in FIG. 3. A diametric end 104 of the periphery of the subassembly located in a reference first axial geometric plane parallel to the plane of the figure, the rotation axis of the bearing being vertical is held in a vice 102 by its finest section, between the cover 22 and the spring support shoulder 46. The support part 38 is rested on a wedge 106 arranged in a second axial plane 108 perpendicular to the first axial plane. A vertical force F corresponding to a torque of F×D=Nm, D being the distance between the point of application of the force F and a second axial geometric plane perpendicular to the first axial plane is applied to the diametric end 110 opposite the vice 102 and located in the first axial plane by means of a support. The deflection angle a of the part of the device located on the side of the diametric end of application of the force F, in the first axial plane, is measured. It is considered that the subassembly and particularly the bearing, is sufficiently rigid when the angle measured is less than 10° and preferably less than 8°. Such rigidity makes it possible to guarantee, under normal conditions of use, absence of friction between the components at the level of the labyrinth.

Figure 4:
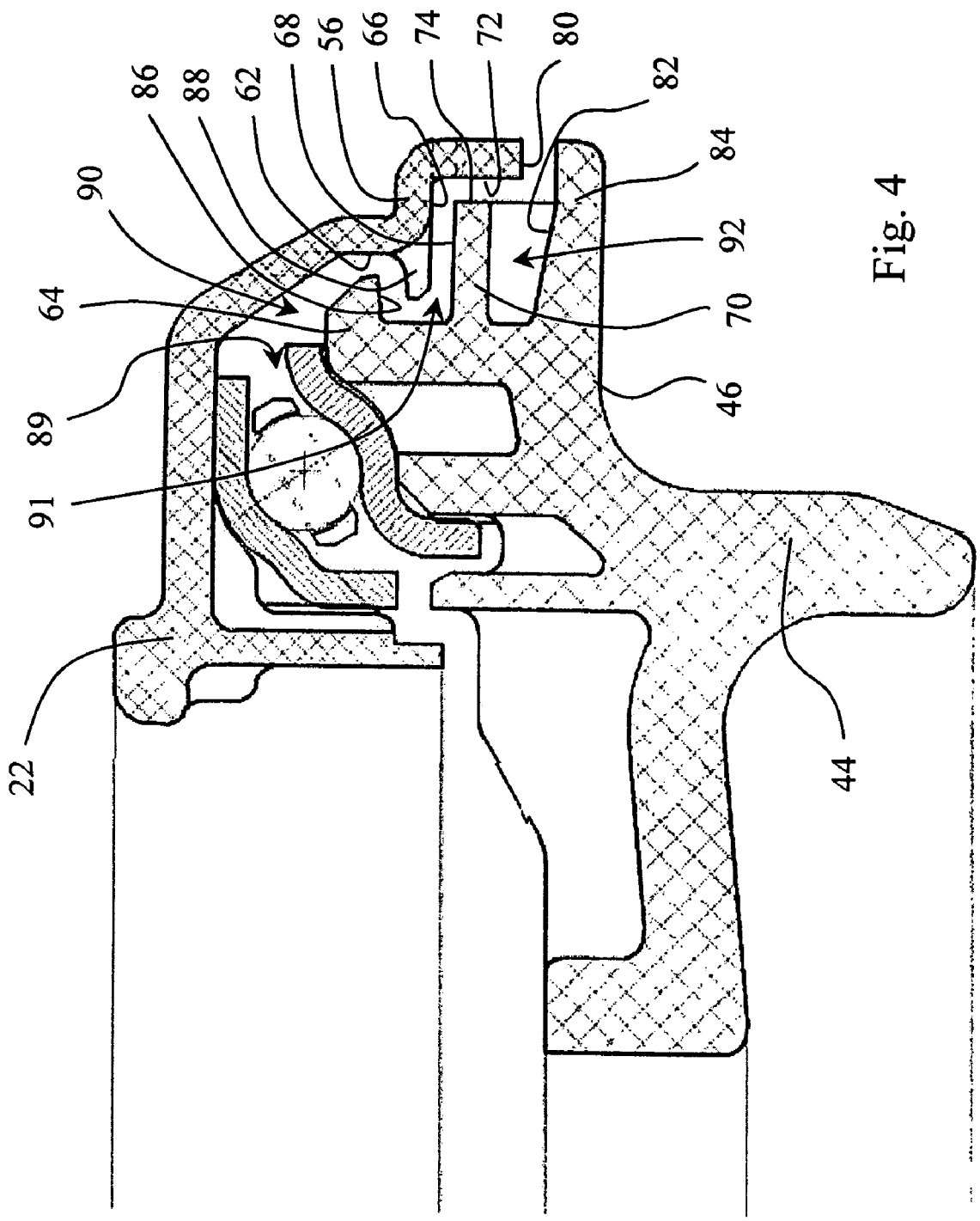
FIG. 4 represents, in an axial cross section, a stop of a suspension strut according to a second embodiment of the invention.

A second embodiment of the invention is represented in FIG. 4. The suspension stop of this second embodiment differs from the first embodiment in that the end edge of the skirt 80 and the wall 82 of the support part opposite it are flat.

Various different modifications are of course possible.

The running bodies may be rollers. The invention is not limited to roller bearings but also applies to smooth bearings.

The support part may be reinforced by a metal insert. Its lower face may be partially covered with a metal dish.

A dense elastomer ring may be arranged between the upper washers and the cover.

The invention claimed is:

1. A suspension stop device for a suspension strut of a vehicle, the strut being equipped with a coil spring, with the device comprising:
   a rigid thrust bearing defining a rotation axis of the device and equipped with a lower metal washer rotating with respect to an upper metal washer;
   a support part made of synthetic material designed to transmit the forces exerted by the spring to the lower washer, the support part comprising an annular support area for the lower washer; and
   a cover covering the upper washer and delimiting with the support part a housing for the bearing, the cover being equipped with a skirt covering without contact a peripheral area of the support part and delimiting with the peripheral area of the support part an annular labyrinth arranged radially with respect to the exterior of the housing and connecting the housing to the outside, the annular labyrinth successively comprising, from the housing to the outside, an initial annular head loss of radial play P1, a second annular head loss of axial play P2, followed by a third annular head loss of radial play P3,
   wherein the skirt comprises an upper cylindrical wall delimiting with the peripheral area of the support part the initial head loss, the peripheral area of the support part comprising an annular flange equipped with a radial end edge located opposite the upper cylindrical wall and delimiting with the upper cylindrical wall the initial head loss,
   wherein the annular flange forms a shoulder interacting with elastic hooks projecting from the skirt of the cover, and
   wherein the peripheral area of the support part delimits with the skirt an intermediate annular cavity located between the initial head loss and the second head loss into which the hooks project.

2. A device according to claim 1, wherein the annular labyrinth comprises, after the third head loss towards the outside, a fourth annular head loss of axial play P4.

3. A device according to claim 2, wherein the skirt comprises a flat or truncated cone-shaped annular wall delimiting with the peripheral area of the support part the fourth head loss, the flat or truncated cone-shaped wall having a radial dimension T.

4. A device according to claim 3, wherein the flat or truncated cone-shaped wall of the skirt is formed by an end edge of the skirt, the skirt having at least at the level of this edge a thickness equal to T.

5. A device according to claim 3, wherein:
   the peripheral area of the support part comprises a flat annular support part wall (68) delimiting with the skirt the second head loss; and
   a second annular wall of the skirt is flat and located at a distance B from the flat or truncated cone-shaped annular wall, the dimensions B and T being linked by the relationship:

$B \leq 3\,T.$

6. A device according to claim 1, wherein the skirt comprises an upper cylindrical wall delimiting with the peripheral area of the support part the initial head loss, wherein the skirt comprises a flat or truncated cone-shaped annular wall delimiting with the peripheral area of the support part the fourth head loss, the flat or truncated cone-shaped wall having a radial dimension T, and wherein the peripheral area of the support part comprises a cylindrical wall forming with the skirt the third head loss that is located at a radial distance A from the upper cylindrical wall of the skirt, the dimensions A and T being linked by the relationship:

$A \leq 2.5\,T.$

7. A device according to claim 1, wherein the skirt comprises an internal cylindrical wall delimiting with the peripheral area of the support part the third head loss.

8. A device according to claim 1, wherein the skirt comprises a flat annular wall delimiting with the peripheral area of the support part the second head loss.

9. A device according to claim 1, wherein the intermediate annular cavity has a radial section area $S_1$ such that $S_1 \geq 4 \times P1 \times P2$.

* * * * *